Feb. 2, 1926.

W. LOBENSTEIN 1,571,848

AUXILIARY EYEGLASSES OR SPECTACLES

Filed June 19, 1925

WITNESSES

INVENTOR
Walter Lobenstein,
BY
ATTORNEYS

Patented Feb. 2, 1926.

1,571,848

UNITED STATES PATENT OFFICE.

WALTER LOBENSTEIN, OF BROOKLYN, NEW YORK.

AUXILIARY EYEGLASSES OR SPECTACLES.

Application filed June 19, 1925. Serial No. 38,349.

*To all whom it may concern:*

Be it known that I, WALTER LOBENSTEIN, a citizen of the United States of America, and a resident of the city of New York, borough of Brooklyn, in the county of Kings and State of New York, have invented new and Improved Auxiliary Eyeglasses or Spectacles, of which the following is a description.

My invention relates to auxiliary glasses to be employed in practice as an attachment for ordinary spectacles or eyeglasses.

The general object of my invention is to provide an attachment that may be applied to ordinary glasses when worn whether spectacles or eyeglasses without inconvenience whereby an oculist may prescribe colored or prescription glasses to be used as an auxiliary to the usual glasses regularly worn.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 1:
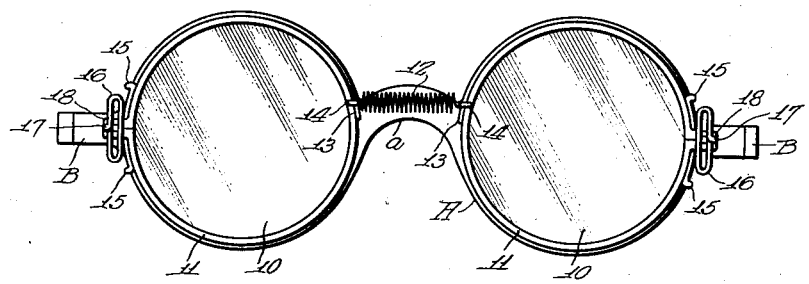
Figure 1 is a front elevation showing my auxiliary glasses applied to an ordinary spectacle frame.
Figure 2:
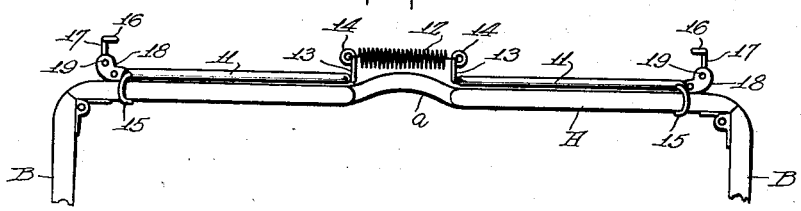
Figure 2 is a plan view thereof.
Figure 3:
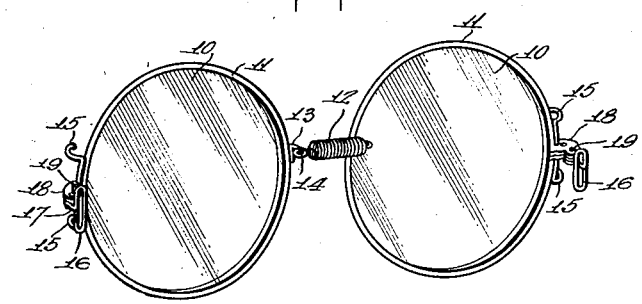
Figure 3 is a separate perspective view of my attachment.

In the illustrated example the letter A indicates an ordinary spectacle frame; 7, the rigid bridge thereof; and B the temples.

In accordance with my invention, I provide lenses 10 which in the illustrated example are fitted in frames 11. The frames 11 are connected by a coil spring 12 positioned to lie adjacent the bridge *a* of the regular spectacle frame or eyeglass frame.

In order that the spring 11 may be disposed in a plane forward of the usual bridge *a* and offset forwardly, and out of contact with the nose of the wearer, the said spring has its ends secured to eyes 14 on forwardly extending members 13 soldered or otherwise made fast to the frame 11. The disposition of the spring 12 forward of the spectacle or eyeglass bridge and thus preventing contact of the spring with the nose of the wearer, through the medium of the members 13, makes the device practical and efficient. It is to be understood that the lenses 10 may be colored lenses or may be prescription lenses complete with spectacle frames, bifocal glasses, for example.

Hooks 15 are provided on the frames 11 at the outer side adapted to engage the frame A near the temples B or equivalent finger-holds on eye-glasses. It will be noted that the hooks 15 extend rearwardly while the members 13 extend forwardly from the planes of the lenses 10 and frames 11.

In order to provide for the convenient application and removal of the attachment to the spectacle frames, I provide in accordance with my invention, finger-holds 16 advantageously in the form of loops formed integral with shanks 17 pivotally secured to ears 18 of the frames 11 by screws 19 or equivalent pivot means. With the described construction, the finger-holds 16 are taken hold of and the frames 11 thus moved in their own planes away from each other, thus placing the spring 12 under tension and increasing the distance between hooks 15 at the respective ends of the attachment. The hooks 15 are then passed rearwardly over the frame A and caused to engage the same by releasing the finger-holds 16 and permitting the spring 12 to react to draw the frames 11 together with the hooks 15 firmly binding against the spectacle frame A. The provision of the finger-holds 16 and their pivotal connection with the lens frames 11 thus promotes convenience in the placing and removal of the attachment and permits of the finger-holds 16 being swung approximately to the plane of the lens frames 11 or to a position extending forwardly for the convenient grasping of the finger-holds.

I would state furthermore that while the illustrated example constitutes a practical embodiment of my invention, I do not limit myself strictly to the exact details herein illustrated since, manifestly, the same can be considerably varied without departure from the spirit of the invention as defined in the appended claims.

Having thus described my invention, I claim:

1. An attachment for spectacles or eyeglasses comprising auxiliary lenses, a retractile spring, and means rigid with said lenses and forming a connection between said spring and lenses, said means extending forwardly to position said spring offset in front of the plane of the lenses to prevent contact of the spring with the nose of the wearer.

2. An attachment for spectacles or eyeglasses comprising auxiliary lenses, a retractile spring, means supporting said spring in a plane in front of the lenses and forming a connection between the spring and the lenses, and means associated with the lenses and adapted to connect with the frame of the spectacles or eyeglasses.

3. An attachment for spectacles or eyeglasses comprising auxiliary lens frames, means on the said frames to engage the same with the frame of spectacles or eyeglasses, a spring connecting the first-mentioned lens frames, and finger-holds on said first-mentioned frames at the outer ends thereof, said finger-holds being pivotally secured to the first-mentioned frames to permit swinging toward or from the first-mentioned frames.

4. An attachment for spectacles or eyeglasses including auxiliary lenses, resilient means disposed between the lenses, and means rigid on the lenses and extending forwardly to position said resilient means offset in front of the plane of the lenses to prevent contact of the resilient means with the nose of the wearer.

WALTER LOBENSTEIN.